3,651,058
PHTHALOCYANINE DYESTUFFS
Victor David Poole, Manchester, England, assignor to Imperial Chemical Industries Limited, London, England
No Drawing. Filed Nov. 7, 1968, Ser. No. 774,199
Claims priority, application Great Britain, Nov. 23, 1967, 53,401/67
Int. Cl. C07d 55/18, 57/00
U.S. Cl. 260—242      7 Claims

ABSTRACT OF THE DISCLOSURE

The invention provides phthalocyanine dyestuffs of the formula:

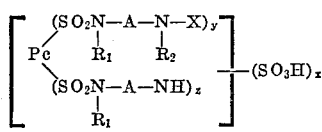

wherein

Pc represents a phthalocyanine nucleus,
A represents an alkylene radical which may be substituted
X represents a s-triazine nucleus carrying at least one cellulose-reactive halogen atom or a pyrimidine nucleus carrying at least one cellulose-reactive halogen atom or methane sulphonyl group,
one of $R_1$ and $R_2$ represents a sulphatoalkyl group and the other represents a hydrogen atom or sulphatoalkyl group,
$x$ has a value of 0 to 2, and $y$ and $z$ have values of from 1 to 3, the sum of the substituents attached directly to the phthalocyanine nucleus benig not greater than 4.

These dyestuffs are distinguished by the unusually high percentage which fixes on the cellulose during the dyeing or printing process.

---

This invention relates to new dyestuffs of the phthalocyanine series, and is particularly concerned with dyestuffs which can be applied to cellulose textile materials by well-known "reactive dye" methods and which achieve very high fixations when so applied.

The excellent fastness to wet processing of textile materials coloured with reactive dye depends on the formation of a chemical linkage between a reactive group in the dyestuff molecule and an amino or hydroxyl group in the textile material during the colouration process. The dyestuffs in practice are always applied from aqueous solutions or aqueous printing pastes and owing to a side-reaction in which the reactive group reacts with water instead of with the textile material, a portion of the dyestuff does not fix on the fibre. In general, the higher the concentration of dyestuff, the smaller is the proportion which reacts. Consequently, an excess of dyestuff must be used and the dyesings or prints must be thoroughly washed with boiling soap or detergent solutions to remove the unfixed dyestuff. This wastage of dyestuff and processing make the dyeing or printing process more expensive, especially when deep shades are required. It has therefore always been desirable that reactive dyestuffs should fix to the extent of 90% and preferably 95% or more but this target has proved very difficult to achieve. The present invention is concerned with a class of reactive dyestuffs whose fixation approaches the desired level and which give prints remarkably free from staining during the washing-off steps in processing, even in strong shades.

According to the invention, there are provided dyestuffs of the formula:

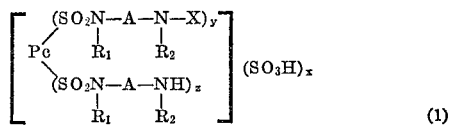

wherein:

Pc represents a phthalocyanine nucleus,
A represents an alkylene radical which may be substituted,
X represents a s-triazine nucleus carrying at least one cellulose-reactive halogen atom or a pyrimidine nucleus carrying at least one cellulose-reactive halogen atom or methane sulphonyl group,
one of $R_1$ and $R_2$ represents a sulphatoalkyl group and the other represents a hydrogen atom or sulphatoalkyl group,
$x$ has a value of 0 to 2, and $y$ and $z$ have values of from 1 to 3, the sum of the substituents attached directly to the phthalocyanine nucleus being not greater than 4.

The phthalocyanine nucleus represented by Pc can be, for example, nickel or cobalt phthalocyanine but is preferably a copper phthalocyanine nucleus. The substituents on the nucleus may be attached to the 4'-positions but are preferable attached to the 3'-positions of the nucleus.

The radicals represented by A are alkylene of 1 to 6 carbon atoms, above all, ethylene or propylene, or an alkylene radical of this kind substituted for example by alkyl, hydroxy or sulphato groups.

As examples of sulphato-alkyl radicals represented by $R_1$ and $R_2$ there may be mentioned sulphato ethyl and sulphato propyl. It is preferred that $R_1$ should be hydrogen and $R_2$ should be sulphato-ethyl groups.

As examples of substituents represented by X there may be mentioned s-triazin-2-yl and pyrimidin-2-yl or -4-yl radicals which contain on at least one of the remaining 2,4 or 6 positions, a bromine or, preferably, a chlorine atom or, in the case of pyrimidyl, a methanesulphonyl group.

In the case of s-triazine, the ring may have a nonreactive substituent on the remaining carbon atom, for example, primary amino and mon- or di-substituted amino groups, etherified hydroxyl and etherified mercapto groups; in the case of substituted amino groups, this class includes, for example, mono- and di-alkylamino groups in which the alkyl groups preferably contain at most 4 carbon atoms, and which may also contain substituents for example, hydroxyl-, sulphato- or alkoxy groups, and phenylamino and naphthylamino groups which are free from sulphonic acid substituents.

The preferred dyestuffs contain a 2-chloro-4-methoxy-6-triazinyl group as substituent.

In order to obtain the desired properties in the new dyestuffs, it appears essential that at most two, and preferably one or no solubilising sulphonic acid group should be present in the dyestuff after fixation. Since it is difficult to avoid the presence of at least one such group attached to the phthalocyanine nucleus by the more convenient methods of manufacture, this means in practice that the radicals A, $R_1$, $R_2$ and X of Formula 1 should in general be free from such groups which remain after the colouration process has been carried out. Thus, whereas these radicals should be free from aromatically-bound sulphonic acid groups which remain attached to the dyestuff molecule during the colouration process, it is permissible and even desirable, that solubilising groups which are hydrolysed during the colouration process should be present. As examples of permissible solubilising groups, there may be mentioned aliphatically bound sulphate ester groups and sulphonic acid groups or sulphophenoxy or sulphophenylthio groups on the heterocyclic nucleus; the latter three are believed to act as cellulose-reactive groups.

Within the above broad definitions, the products preferred for dyeing contain a total of 3 sulphonic acid and sulphate ester groups and the products preferred for printing contain a total of 4 sulphonic acid and sulphate ester groups.

Starting materials suitable for use in manufacture of the new dyestuff can be conveniently synthesised from the unsubstituted or sulpho-substituted phthalocyanine by treatment with chlorosulphonic acid, optionally in the presence of thionyl chloride or phosphorus trichloride to form a phthalocyanine polysulphonyl chloride; thereafter contacting the polysulphonyl chloride with an aqueous solution of an aliphatic diamine of the structure

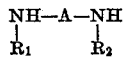

so as to obtain a substituted phthalocyanine or mixture of substituted phthalocyanine having 0-2 sulphonic acid groups and from 2 to 4 sulphonamide groups of the formula;

 (2)

wherein A, $R_1$ and $R_2$ have the meanings stated above.

Where, as in the preferred dyestuffs of the invention, the alkyl groups represented by $R_2$ contain sulphate ester groups, the sulphate ester groups can be present in the diamine reacted with the phthalocyanine polysulphonchloride, but are preferably introduced by condensing the phthalocyanine polysulphonchloride with a N-(hydroxyalkyl)alkylene diamine and subjecting the resultant product to a sulphating process, e.g. by stirring for a short time in 100% sulphuric acid.

For manufacture of the phthalocyanine polysulphonchlorides, treatment of unsubstituted phthalocyanines with chlorosulphonic acid alone provide products substituted primarily in the 3'-position with sulphonyl chloride and a small proportion of sulphonic acid groups; for manufacture of 4'-substituted compounds it is necessary to start from the corresponding 4'-sulphonic acid derivative and convert this to the sulphonchloride. The number of groups introduced can be varied by the temperature and duration of the treatment with chlorosulphonic acid, and the proportion of sulphonyl chloride to sulphonic acid groups in the product can be varied by the addition of thionyl chloride or phosphorus trichloride to the chlorosulphonation mixture.

As examples of aliphatic diamines which can be used for manufacture of the substituted phthalocyanines, there may be mentioned 2-hydroxy-propylene-1:3-diamine, N-(2-hydroxyethyl)ethylene diamine, N:N'-di-(2-hydroxyethyl)ethylene diamine and 2-sulphato-propylene-1:3-diamine.

The new dyestuffs can be obtained by reacting the substituted phthalocyanines or mixture of substituted phthalocyanines of the kind described above with from 1 to $n-1$ moles of a compound of the formula X. halogen where $n$ is the total number of sulphanamide groups of Formula 2 per phthalocyanine nucleus and X has the meaning stated above. This process forms a further feature of the invention.

The above process can conveniently be carried out by stirring a mixture of the compound of formula X. halogen and the substituted phthalocyanine or mixture of substituted phthalocyanines in an aqueous medium, in the presence of an acid-binding agent to absorb the liberated hydrogen halide. The reaction can be carried out at a suitable temperature within the range of from 0° to about 60° C., depending on the particular compound X. halogen used.

As examples of compounds of the formula X. halogen which can be used, there may be mentioned 4,5-dichloro-6-methyl-2-methyl-sulphonylpyrimidine, 2:4:6 - tribromo and trichloro-pyridimidines, 2:4:5:6-tetrachloropyrimidine, 5-methyl-2:4:6-trichloropyrimidine, 2:4-dichloro-5-nitro-6-methylpyrimidine, 2:4-dichloro-5-nitropyrimidine, 2:4:6-trichloro-5-cyanopyrimidine, 5-carboethoxy-2:4-dichloropyrimidine, 5-carboxy - 2:4 - dichloropyrimidine, cyanuric bromide, cyanuric chloride and the primary condensation products of cyanuric bromide or cyanuric chloride with ammonia or an organic mercaptan, hydroxy compound or an organic primary or secondary amine in which any solubilising groups are capable of hydrolysis for example methanol, ethanol, isopropanol, phenol, o-, m- and p-chlorophenols, o-, m- and p-sulphophenols, thiophenol, thioglycollic acid, dimethyldithiocarbamic acid, mercaptobenzthiazole, thioacetamide, methyl-, dimethyl-, ethyl-, diethyl-, n-propyl, iso-propyl, butyl, hexyl-, or cyclo hexylamide, toluidine, piperidine, morpholine, methoxyethylamine and ethanolamine.

The invention also provides a modification of the above process for manufacture of the dyestuffs of Formula 1 in which X stands for a s-triazine nucleus substituted by a chlorine or bromine atom and an amino or substituted amino group wherein cyanuric chloride or cyanuric bromide is used to form a dyestuff of Formula 1 in which X stands for a s-triazine nucleus substituted by two chlorine or bromine atoms and this dyestuff is reacted with one mole of ammonia or a primary or secondary amine for each triazine nucleus.

The reaction of compounds of Formula 1 wherein a chlorine or bromine atom on a s-triazine nucleus is replaced by a different substituent are preferably carried out in an aqueous medium at a pH of from 5 to 7, any liberated hydrogen halide being neutralised by the addition of an acid-binding agent for example sodium hydroxide or carbonate. A reaction temperature up to about 60° C. may be necessary.

The new dyestuffs can be isolated by the usual techniques adapted for isolation of water soluble reactive dyestuffs, for example, by salting out or by spray-drying the reaction mixture in which the dyestuff has been formed. If desired, stabilisers, for example, alkali metal hydrogen phosphates, may be added.

The new water-soluble dyestuffs are valuable for colouring textile material, for example, textile materials comprising natural or regenerated cotton. For colouring such textile materials, the new dyestuffs are preferably applied, either by a dyeing or printing process to the cellulose textile materials in conjunction with a treatment with an acid-binding agent, for example, sodium hydroxide, sodium carbonate or sodium bicarbonate which may be applied to the cellulose textile material before, during or after the application of the dyestuffs. Alternatively when the colouration process involves the use of a heating step a substance can be used, for example, sodium trichloroacetate, which is changed into an acid-binding agent during the heating step. When so applied to cellulose textile materials the new dyestuffs provide turquoise-blue shades having very good fastness to light and to wet treatments especially to severe washing. Furthermore only a very small proportion of the dyestuff is removed during the usual soaping-off treatments usual in reactive dye colouration processes, the new dyestuffs being much superior in this respect than comparable known dyestuffs in which all the

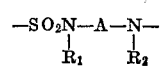

groups carry a reactive substituent as defined by X, or in which there are present more than two sulphonic acid groups which remain attached to the molecule during the colouration process.

The invention is illustrated but not limited by the following examples in which parts and percentages are by weight:

EXAMPLE 1

A mixture of 57.6 parts of copper phthalocyanine and 300 parts of chlorosulphonic acid is stirred for 3 hours at 135–140° C. The mixture is cooled to 80° C., 50 parts of thionyl chloride are added and the mixture is stirred for 2 hours at 85–90° C. The mixture is cooled to 20° C. and poured on to ice and the precipitated sulphonchloride is filtered off and washed with 500 parts of water.

A mixture of the phthalocyanine sulphonchloride obtained and 1000 parts of water is stirred at 0–5° C. and the pH of the mixture is adjusted to 7 by the addition of sodium hydroxide solution. 62 parts of N-($\beta$-hydroxyethyl)ethylene diamine are added and the mixture is stirred at 15–20° C. for 18 hours. The product is filtered off, washed with 200 parts of water, and dried.

A mixture of 25 parts of the above product and 230 parts of 100% sulphuric acid is stirred at 15–20° C. for 18 hours. The mixture is poured on to ice and the precipitated product is filtered off and drained well. The product is stirred with 500 parts of water and the pH of the mixture is adjusted to 10 by the addition of sodium hydroxide solution. The product is precipitated by the addition of potassium acetate, filtered off, then washed with a 20% solution of potassium acetate, then washed with ethanol and dried. 15.5 parts of the above product are stirred with 250 parts of water at 35° C. until a clear solution is obtained, whereupon a solution of 1.8 parts of 2:4-dichloro-6-methoxy-triazine in 20 parts of acetone is added. 10 parts of 4% sodium hydroxide solution are added over 5 minutes followed by a solution of 7 parts of potassium dihydrogen phosphate and 3.5 parts of disodium hydrogen phosphate in 50 parts of water. The dyestuff is precipitated with salt, filtered off and dried.

It consists of a mixture having the average formula:

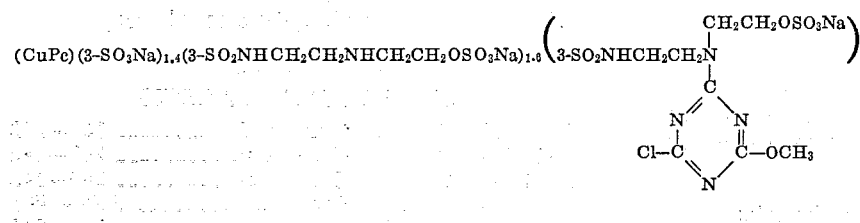

A print paste containing:

| | Parts |
|---|---|
| Dyestuff | 3.3 |
| Water | 49.2 |
| Urea | 10 |
| 4% aqueous sodium alginate | 35 |
| Sodium m-nitrobenzene sulphonate | 1 |
| Sodium bicarbonate | 1.5 | is applied to mercerised cotton fabric by a roller printing machine and the fabric is dried in air at 60° C. and steamed at 100° C. for 5 minutes.

The fabric is coloured a bright turquoise-blue shade of excellent fastness to washing and to light, and has such a high proportion of dyestuff fixed that only a brief rinse in water is necessary. Spectroscopic measurements indicate that 95% of the dyestuff applied has been fixed on the fabric.

EXAMPLE 2

This dyestuff may be prepared as described in Example 1 but using the sulphonchloride prepared by heating a mixture of 57.6 parts of copper phthalocyanine and 660 parts of chlorosulphonic acid at 120° C. for 2½ hours.

It consists of the dyestuff of formula:

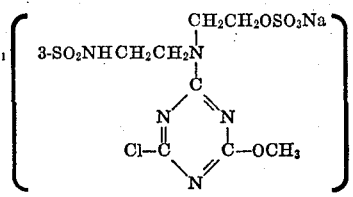

When printed on mercerised cotton fabric by the method described in Example 1, bright turquoise blue shades are obtained, the fixation being 80% of the dyestuff applied; when used for dyeing, fixations of 85–90% can be achieved.

EXAMPLE 3

This dyestuff may be prepared as described in Example 1 but using the sulphonchloride prepared by heating a mixture of 57.6 parts copper phthalocyanine and 280 parts of chlorosulphonic acid at 135–140° C. for 4 hours, cooling to 95–100° C. and adding 83 parts of phosphorus trichloride over 2 hours.

It consists of the dyestuff of formula:

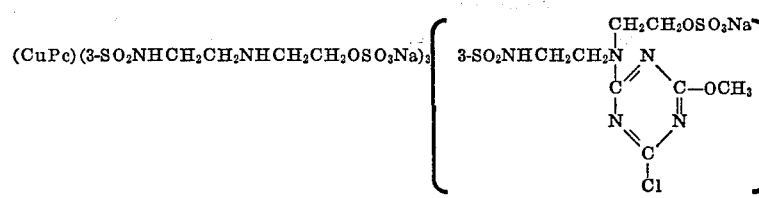

When printed on mercerised cotton fabric by the method described in Example 1, bright turquoise blue shades are obtained, the fixation being 98% of the dyestuff applied.

EXAMPLE 4

This dyestuff may be prepared as described in Example 1 but using the sulphonchloride prepared by heating a mixture of 57.6 parts of copper phthalocyanine and 660 parts of chlorosulphonic acid at 120° C. for 2 hours, cooling to 80–85° C., adding 50 parts of thinoyl chloride and stirring for 2 hours at 85–90 C.

It consists of a mixture having the average formula:

$$CuPc(3-SO_2NHCH_2CH_2NHCH_2CH_2OSO_3Na)_{1.4}(3-SO_2NHCH_2CH_2N-C\cdots)$$

with substituent containing $CH_2CH_2OSO_3Na$ and triazine ring with $-OCH_3$ and $-Cl$.

When printed on mercerised cotton fabric by the method described in Example 1, bright turquoise blue shades are obtained, the fixation being 95% of the dyestuff applied.

The following table describes further examples of the new dyestuffs obtained by replacing the 62 parts of N-(β-hydroxyethyl)ethylene diamine used in Example 1 by:

Example:
- 5—71 parts of N-(β-hydroxyethyl) - 1,3 - diaminopropane
- 6—79 parts of 1-amino - 2 - methyl - 2 - N - (β-hydroxyethyl)aminopropane.
- 7—71 parts of N-(β-hydroxypropyl) - ethylenediamine
- 8—98 parts of N,N' - di - (β - hydroxyethyl)propylene diamine The following table describes further examples of the new dyestuffs obtained by replacing the 1.8 parts of 2,4-dichloro - 6 - methoxy-s-triazine used in Example 1 by:

Example:
- 9—1.7 parts of 2,4-dichloro-6-amino-s-triazine
- 10—2.5 parts of 2,4-dichloro-6-phenoxy-s-triazine
- 11—2.4 parts of 2,4-dichloro-6-anilino-s-triazine
- 12—1.8 parts of 2,4,6-trichloropyrimidine
- 13—2.3 parts of 2,4,5,5-tetrachloropyrimidine
- 14—2.1 parts of 2,4,6-trichloro-5-cyanopyrimidine
- 15—2.2 parts of 2,4,6-trichloro - 5 - carbethoxypyrimidine
- 16—2.0 parts of 2,4-dichloro-5-carboxypyrimidine
- 17—2.4 parts of 2-methylsulphonyl - 4,5 - dichloro-6-methylpyrimidine All the above dyestuffs give bright turquoise blue shades of excellent fastness to washing and to light when dyed or printed on cotton in the presence of sodium carbonate or sodium bicarbonate.

What we claim is:

1. A phthalocyanine dyestuff of the formula:

$$\left[ Pc \begin{matrix} (SO_2N-A-N-X)_y \\ | \quad | \\ R_1 \quad R_2 \\ (SO_2N-A-NH)_z \\ | \quad | \\ R_1 \quad R_2 \end{matrix} \right] (SO_3H)_x \quad (1)$$

wherein
Pc represents copper, nickel or cobalt phthalocyanine,
A represents alkylene of 1–6 carbon atoms,
X represents the s-triazine radical $$-C\begin{matrix}N\\||\\N\end{matrix}C-X^1$$
(with Cl substituent)

wherein
$X^1$ is $OCH_3$, $OC_6H_5$, $NH_2$ or $NHC_6H_5$,
one of $R_1$ and $R_2$ represents sulphato-loweralkyl and the other represents a hydrogen atom or sulphato-loweralkyl,
$x$ has a value of 0 to 2, and $y$ and $z$ have values of from 1 to 3, the sum of the substituents attached directly to the phthalocyanine nucleus being not greater than 4 with no more than one of said substituents being on any one of the rings of the phthalocyanine nucleus and provided that said substituents are in either the 3 or 4 positions of said rings.

2. A phthalocyanine dyestuff as claimed in claim 1 wherein Pc represents a copper phthalocyanine nucleus.

3. A phthalocyanine dyestuff as claimed in claim 1 wherein the substituents on the nucleus are attached to the 3'-positions of the nucleus.

4. A phthalocyanine dyestuff as claimed in claim 1 wherein A represents ethylene or propylene.

5. A phthalocyanine dyestuff as claimed in claim 1 wherein $R_1$ represents a hydrogen atom and $R_2$ represents a sulphatoethyl group.

6. A phthalocyanine dyestuff as claimed in claim 1 wherein X represents a 2-chloro-4-methoxy-6-s-triazinyl group.

7. A phthalocyanine dyestuff as claimed in claim 1 wherein:

Pc is a copper phthalocyanine nucleus;
A is ethylene or propylene;
$R_1$ is hydrogen;
$R_2$ is sulphatoethyl; and
X is a 2-chloro-4-methoxy-6-s-triazinyl group.

References Cited
UNITED STATES PATENTS

| | | | |
|---|---|---|---|
| 3,053,850 | 9/1962 | Clark et al. | 260—242 |
| 3,133,059 | 5/1964 | Clark et al. | 260—242 |
| 3,351,594 | 11/1967 | Clark et al. | 260—242 |
| 3,405,133 | 10/1968 | Poole | 260—249.5 |
| 3,519,614 | 7/1970 | Ponzini | 260—242 |

NATALIE TROUSOF, Primary Examiner

U.S. Cl. X.R.

8—1 XA, 54.2, 62; 260—249.5, 256.5 R